(12) United States Patent
Goodson et al.

(10) Patent No.: US 8,902,102 B2
(45) Date of Patent: Dec. 2, 2014

(54) PASSIVE BISTATIC RADAR FOR VEHICLE SENSE AND AVOID

(75) Inventors: Anthony P. Goodson, Seattle, WA (US); Michael A. Loudiana, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 482 days.

(21) Appl. No.: 13/286,235

(22) Filed: Nov. 1, 2011

(65) Prior Publication Data
US 2013/0106645 A1    May 2, 2013

(51) Int. Cl.
*G01S 13/93* (2006.01)
*G01S 13/00* (2006.01)

(52) U.S. Cl.
CPC ........... *G01S 13/9303* (2013.01); *G01S 13/003* (2013.01)
USPC ........................................................ 342/29

(58) Field of Classification Search
CPC ..... G01S 13/781; G01S 13/91; G01S 7/2955; G01S 13/003; G01S 13/9303; G01S 19/51; G01S 2205/005; G01S 5/0072; G08G 5/045
USPC .................................................... 342/29-32
See application file for complete search history.

(56) References Cited

U.S. PATENT DOCUMENTS

| | | | |
|---|---|---|---|
| 4,746,924 A | 5/1988 | Lightfoot | |
| 4,959,655 A * | 9/1990 | Lamiraux | 342/389 |
| 6,133,867 A * | 10/2000 | Eberwine et al. | 342/29 |
| 6,861,982 B2 * | 3/2005 | Forstrom et al. | 342/387 |
| 8,362,943 B2 * | 1/2013 | Jacobs et al. | 342/29 |
| 2012/0001793 A1 * | 1/2012 | Jacobs et al. | 342/146 |
| 2013/0106645 A1 * | 5/2013 | Goodson et al. | 342/29 |

FOREIGN PATENT DOCUMENTS

WO    WO0235252    5/2002

OTHER PUBLICATIONS

GB Search Report, GB1218464.4, Feb. 1, 2013.
Hugh D. Griffiths, and Chris J. Baker, "Measurement and Analysis of Ambiguity Functions of Passive Radar Transmissions", Radar Conference, IEEE International, pp. 321-325, May 2005, Digital Object Identifier: 10.1109/RADAR.2005.1435844.
R. Saini, and M. Cherniakov, "DTV signal ambiguity function analysis for radar application", IEE Proc., Radar Sonar Navig. vol. 152, Issue 3, pp. 133-142, Jun. 2005.

(Continued)

*Primary Examiner* — John B Sotomayor
(74) *Attorney, Agent, or Firm* — Ameh IP; Elahe Toosi; Lowell Campbell

(57) ABSTRACT

A system and methods for onboard sense and avoidance of an object are disclosed. At least one transmitter and at least one transmitter location of the at least one transmitter are selected from a database of transmitters based on a vehicle location of a vehicle, and at least one total signal is received at the vehicle. The at least one total signal comprises a direct signal of at least one broadcast signal from the at least one transmitter, and a reflection signal comprising a reflection of the broadcast signal reflected off an object. An estimated object location of the object is estimated based on the at least one total signal, the at least one transmitter location, and the vehicle location.

20 Claims, 7 Drawing Sheets

(56) References Cited

OTHER PUBLICATIONS

O'Hagan, D.W., and Baker, C.J., "Passive Bistatic Radar (PBR) Using FM Radio Illuminators of Opportunity", New Trends for Environmental Monitoring Using Passive Systems, IEEE, pp. 1-6, Oct. 2008, Digital Object Identifier: 10.1109/PASSIVE.2008.4787000.

Colone, F., Cardinali, R., and Lombardo, P., "Cancellation of clutter and multipath in passive radar using a sequential approach", IEEE Radar Conference, pp. 393-399, Apr. 2006, Digital Object Identifier: 10.1109/RADAR.2006.1631830.

P.E. Howland, D. Maksimiuk, and G. Reitsma, "FM radio based bistatic radar", IEE Proc. Radar Sonar Navig., vol. 152, Issue 3, pp. 107-115, Jun. 2005, Digital Object Identifier: 10.1049/ip-rsn:20045077.

H.D. Griffiths, C.J. Baker, H. Ghaleb, R. Ramakrishnan, and E. Willman, "Measurement and analysis of ambiguity functions of off-air signals for passive coherent location", Electronics Letters, vol. 39, Issue 13, pp. 1005-1007, Jun. 2003, Digital Object Identifier: 10.1049/el:20030646.

Colone, F., O'Hagan, D.W., Lombardo, P., and Baker, C.J., "A Multistage Processing Algorithm for Disturbance Removal and Target Detection in Passive Bistatic Radar", IEEE Transactions on Aerospace and Electronic Systems, vol. 45, Issue 2, pp. 698-722, Apr. 2009, Digital Object Identifier: 10.1109/TAES.2009.5089551.

Sahr, and J. D., and F. D. Lind (1997), "The Manastash Ridge radar: A passive bistatic radar for upper atmospheric radio science", Radio Science., vol. 32, Issue 6, pp. 2345-2358, Nov.-Dec. 1997, Digital Object Identifier: 10.1029/97RS02454.

Jonathan Baniak, Dr. Gregory Baker, Ann Marie Cunningham, Lorraine Martin, "Silent Sentry™ Passive Surveillance", Jun. 7, 1999; http://servv89pn0aj.sn.sourcedns.com/~gbpprorg/mil/radar/sentry.pdf Accessed Dec. 11, 2012.

* cited by examiner

PASSIVE BISTATIC RADAR FOR VEHICLE SENSE AND AVOID

FIELD

Embodiments of the present disclosure relate generally to sensor systems. More particularly, embodiments of the present disclosure relate to passive radar for vehicle collision avoidance.

BACKGROUND

In about 95% of airspace above the continental United States below 10,000 feet, there is no current or planned Federal Aviation Agency requirement for aircraft to broadcast their location. Manned aircraft, and unmanned aircraft systems (UASs) such as unmanned aerial vehicles (UAVs) should be able to avoid other piloted and unmanned aircraft that may not be broadcasting their location. Routine access of the UASs to the National Air Space (NAS) of the United States is expected to require a means for avoiding collision with the other piloted and unmanned aircraft.

SUMMARY

A system and methods for onboard sense and avoidance of an object are disclosed. At least one transmitter and at least one transmitter location of the at least one transmitter are selected from a database of transmitters based on a vehicle location of a vehicle, and at least one total signal is received at the vehicle. The at least one total signal comprises a direct signal of at least one broadcast signal from the at least one transmitter, and a reflection signal comprising a reflection of the broadcast signal reflected off an object. An estimated object location of the object is estimated based on the at least one total signal, the at least one transmitter location, and the vehicle location.

In this manner, signals broadcast from ambient transmitters with known locations such as a Frequency Modulated (FM) radio transmitter, a High Definition Digital Television (HDTV) transmitter, a cellular phone transmitter, a Global Positioning System (GPS) transmitter, an Iridium transmitter, or other transmitter, may be used to detect and avoid an object.

In an embodiment, a method for onboard sense and avoidance of an object selects at least one transmitter and at least one transmitter location of the at least one transmitter from a database of transmitters based on a vehicle location of a vehicle, and receives at least one total signal at the vehicle. The total signal comprises a direct signal of at least one broadcast signal from the transmitter, and a reflection signal comprising a reflection of the at least one broadcast signal reflected off an object. The method further estimates an estimated object location of the object based on the total signal, the transmitter location, and the vehicle location.

In another embodiment, a passive bistatic radar onboard sense and avoidance system comprises a transmitter selector module, a receiver module, and a processing module. The transmitter selector module is operable to select at least one transmitter and at least one transmitter location of the transmitter from a database of transmitters based on a vehicle location of a vehicle. The receiver module is operable to receive at least one total signal at the vehicle, the total signal comprising a direct signal of at least one broadcast radio signal from the transmitter, and a reflection signal comprising a reflection of the broadcast radio signal reflected off an object. The processing module is operable to estimate an estimated object location of the object based on the total signal, the transmitter location, and the vehicle location.

In a further embodiment, a method for correcting a reflected signal from an object selects at least one transmitter and at least one transmitter location of the transmitter from a database of transmitters based on a vehicle location of a vehicle. The method further calculates at least one phase shift between a plurality of antennas of the vehicle based on the transmitter location such that at least one direct signal of at least one broadcast radio signal from the transmitter received at each of the antennas is substantially cancelled.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
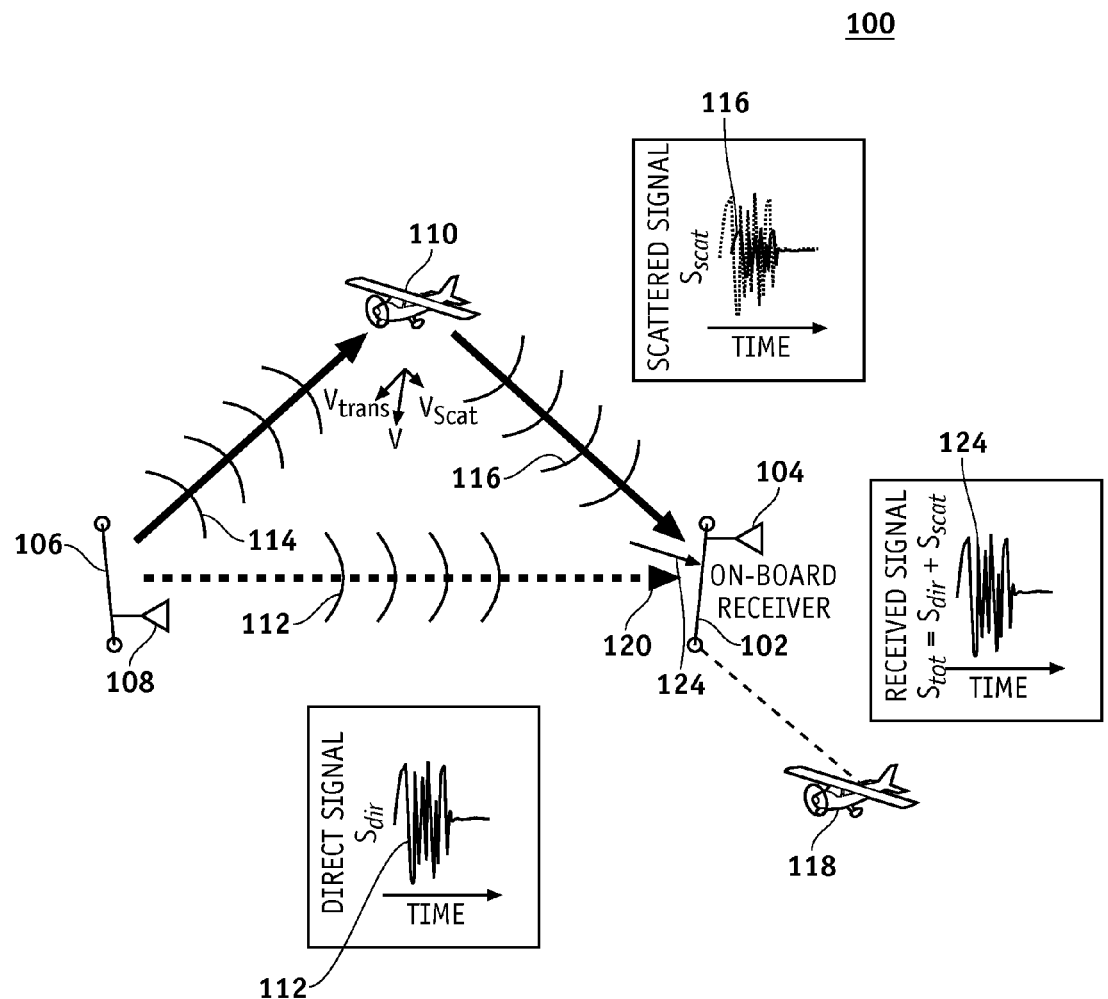
FIG. 1 is an illustration of an exemplary radio frequency environment of a passive bistatic radar for collision avoidance according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to radar, communication systems, network protocols, and other functional aspects of the systems (and the individual operating components of the systems) may not be described in detail herein.

Embodiments of the disclosure are described herein in the context of a practical non-limiting application, namely, an aircraft. Embodiments of the disclosure, however, are not limited to such aircraft, and the techniques described herein may also be utilized in other applications. For example but without limitation, embodiments may be applicable to manned and unmanned ground, air, space, water and underwater vehicles, and any other type of special or general purpose vehicle desirable or appropriate for a given application or environment.

As would be apparent to one of ordinary skill in the art after reading this description, the following are examples and embodiments of the disclosure and are not limited to operating in accordance with these examples. Other embodiments may be utilized and changes may be made without departing from the scope of the exemplary embodiments of the present disclosure.

Current technology solution for collision avoidance in the National Airspace System (NAS) requires "cooperative" traffic. If an aircraft or airborne vehicle is to use current technical means to sense a second aircraft or airborne vehicle, the second aircraft must employ an operable transponder (which broadcasts a response to a radar query) or an operable automatic dependent surveillance-broadcast (ADS-B) device (which periodically broadcasts the second aircraft's location and other information). For about 95% of the airspace below 10,000 feet, there is no current or planned government requirement for aircraft to have transponders or ADS-B devices.

Routine access of Unmanned Aircraft Systems (UAS) to the NAS will require a means for avoiding collision with other (piloted and unmanned) aircraft that are not broadcasting their location as well as those that are. In order to avoid collision, the first airborne vehicle (whether manned aircraft or UAS) will be required to sense and track other aircraft in its vicinity so it can perform appropriate evasive maneuvers. This may also be used in piloted aircraft to augment the "See and Avoid" requirement of government. The aircraft can optimally execute a commanded avoidance maneuver by one of an operator command and an autonomous automatic command.

Embodiments of the disclosure provide a means for collecting radio frequency (RF) signals (e.g., a UHF signal or a VHF signal) direct from ambient transmitters and scattered from other aircraft and a means for processing the RF signals with knowledge of the transmitters' locations on board an aircraft in order to sense the other aircraft for the purpose of collision avoidance. The aircraft can perform appropriate evasive maneuvers by generating a commanded avoidance maneuver. The commanded avoidance maneuver can optimally be executed by an operator command, an autonomous automatic command, or a combination thereof.

FIG. 1 is an illustration of an exemplary radio frequency environment 100 of a passive bistatic radar collision avoidance system for collision avoidance according to an embodiment of the disclosure.

The environment 100 may comprise an on-board receiver 102 comprising at least one on-board antenna(s) 104 coupled to a host platform 118, at least one broadcast transmitter 106 (transmitter 106) comprising broadcast antennas 108, and a nearby traffic aircraft 110 (traffic aircraft 110). In this document, a host platform 118, a vehicle 118, and an airborne vehicle 118 may be used interchangeably. Also, in this document, a traffic aircraft 110, a target 110, and an object 110 may be used interchangeably.

The host platform 118 does not require a transmitter, but rather it makes use of available transmitters such as High Definition Digital Television (HDTV) broadcast stations. Thus, the system 100 is referred to as a "passive" system. The vehicle 118 may comprise, for example but without limitation, an airborne aircraft such as the airborne vehicle 118, an UAS, or other manned and unmanned airborne vehicle, manned and unmanned ground, space, water and underwater vehicles, or other types of vehicles.

The broadcast antennas 108 may comprise, for example but without limitation, an FM radio antenna, an HDTV broadcast antenna, or another frequency source (radio frequency source) operable to transmit radio frequency electromagnetic radiation. A portion of the transmitted electromagnetic radiation travels directly to the vehicle 118 via a direct signal 112 ($S_{dir}$) (a direct signal of the broadcast radio signal 114) and a portion of the transmitted electromagnetic radiation travels towards the traffic aircraft 110 (object 110) via a broadcast radio signal 114 (broadcast signal 114).

The transmitter 106 may comprise, a stationary broadcast transmitter having its location determined by at least a longitude and a latitude thereof, a space-based broadcast transmitter having its location determined by at least a ballistic obit, or other similar class of transmitters. The stationary broadcast transmitter may comprise, for example but without limitation, an HDTV transmitter, an FM radio transmitter, a cell phone transmitter, or a similar transmitter. A space-based broadcast transmitter may comprise, a GPS transmitter, an Iridium transmitter, or other space based transmitter.

The broadcast radio signal 114 originated from the broadcast antennas 108 is scattered (reflected) from the traffic aircraft 110 to provide a reflection signal 116. Thus, the scattered/reflection signal 116 ($S_{scat}$) comprises the broadcast radio signal 114 transmitted from broadcast antennas 108 of the broadcast transmitter 106 reflected off the traffic aircraft 110. The broadcast radio signal 114 may comprise, for example but without limitation, an Ultra High Frequency (UHF) signal, a Very High Frequency (VHF) signal, a Frequency Modulation (FM) signal, an Amplitude Modulation (AM) signal, a short wave signal, or other radio signal, a space-based transmitter signal associated with space-based transmitters (e.g., GPS and Iridium), and a short wave signal, with an ability to use an estimate of a location from one class of radio signal to expedite a detection process using another class of radio signal.

The on-board antennas 104 are each operable to receive at least one total signal 124 respectively comprising the reflection signal 116 and the direct signal 112, at the on-board receiver 102 of the airborne vehicle 118. The on-board-antennas 104 may comprise UHF/VHF antennas already installed on the airborne vehicle 118 for communications purposes, or they may be commercial off the shelf (COTS) low gain UHF/VHF aviation antennas with low aerodynamic drag.

The object 110 may comprise an object, such as but without limitation, an airborne aircraft such as the traffic aircraft 110, a target, a mountain, a building, a tower, a balloon, a motor vehicle, a ship, or other object near the airborne vehicle 118. A location of the traffic aircraft 110 can be estimated based on the received signals, comprising the direct signals 112 and the reflection signal 116, locations of the broadcast transmitters 106, and a location of the airborne vehicle 118 as described below. A velocity vector of the traffic aircraft 110 is estimated by utilizing Doppler shifts of the reflection signal 116 caused by a relative motion of the traffic aircraft 110, the airborne vehicle 118, and the broadcast transmitters 106.

The direct signal 112 traveling along a direct path 120 from the broadcast antennas 108 is much stronger than the reflection signal 116 (scattered signal 116). In one embodiment, a phase shift can be determined between the on-board antennas 104 (receiving antennas) to result in destructive interference of the direct signal ($S_{dir}$) 112, minimizing an impact of the direct signal 112 on the scattered signal ($S_{scat}$) 116. There are at least 3 primary differences between the direct signal 112 and the scattered signal 116:

1) the direct signal 112 is generally much stronger than the scattered signal 116 due to a longer path length traveled by the scattered signal 116. Also, only a portion of the broadcast radio signal 114 is scattered towards the on-board receiver 102 (systems 200-400 in FIGS. 2-4) as determined by the bistatic cross section of the traffic aircraft 110.

2) the scattered signal 116 is delayed in time relative to the direct signal 112 due to a longer distance of a longer path length traveled; and 3) there is a frequency shift between the direct signal 112 and the scattered signal 116 due to Doppler Effect resulting from a relative motion of the broadcast antennas 108, the traffic aircraft 110, and the airborne vehicle 118. Specifically, a Doppler frequency shift is $f_D = f_{trans}(V_{trans} + V_{scat})/c$, where $f_{trans}$ is a transmitter frequency, $V_{trans}$ is a rate of closure between the traffic aircraft 110 and the broadcast antennas 108, $V_{scat}$ is a rate of closure between the traffic aircraft 110 and the airborne vehicle 118, and c is the speed of light.

The total signal 124 can be combined with a time lagged recording of itself to form a bistatic ambiguity function shown by equation (1) below:

$$\psi(\tau, f_D) = \int_0^{T_0} S_{tot}(t) \times S_{tot}^*(t-\tau) \times e^{j2\pi f_D t} dt \quad (1)$$

where the term $S_{tot}(t) \times S_{tot}^*(t-\tau)$ can be expanded as follows:

$S_{dir}(t) \times S_{dir}^*(t-\tau) + S_{dir}(t) \times S_{scat}^*(t-\tau) + S_{scat}(t) \times S_{dir}^*(t-\tau) + S_{scat}(t) \times S_{scat}^*(t-\tau)$ Equation (1) or the ambiguity function $\psi(\tau, f_D)$ is used to extract a lag time/time delay ($\tau$) and the Doppler frequency shift ($f_D$) of the traffic aircraft 110 from the total signal ($S_{total}$) 124 received. Where, t is time, $T_o$ is a sampling time suitably selected for detection of the $S_{tot}$. Equation (1) is a Fourier transform of the signal $S_{tot}$ (t) times a complex conjugate $S_{tot}$ (t)* of a time-delayed version of itself. In this example, a single signal $S_{tot}$ (t) is multiplied by the complex conjugate $S_{tot}$ (t)* of itself. In some embodiments, a signal with the direct transmitter signal minimized is multiplied by complex conjugate of the signal with the direct transmitter signal maximized, thereby increasing a detection range of the traffic aircraft 110 for processing systems having fixed dynamic range.

When the bistatic ambiguity function $\psi(\tau, f_D)$ is calculated for a large number of different delay times $\tau$ and Doppler frequency shifts $f_D$, the bistatic ambiguity function $\psi(\tau, f_D)$ can be plotted in a two dimensional plane comprising the time delay $\tau$ (which corresponds to a bistatic range) and frequency (which corresponds to bistatic Doppler velocity). A presence of the (detectable) traffic aircraft 110 may result in a local maximum in the bistatic ambiguity function $\psi(\tau, f_D)$. If this local maximum is above a noise and clutter levels, the traffic aircraft 110 can be detected by finding the local maximum using a detection threshold.

A range R1 of the broadcast radio signal 114 comprises a distance from the broadcast transmitter 106 to the traffic aircraft 110. A range R2 of the scattered signal 116 comprises a distance from the traffic aircraft 110 to the on-board receiver 102. A range $R_{direct}$ of the direct signal 112 comprises a distance from the broadcast transmitter 106 to the on-board receiver 102. The bistatic range comprises the range R1 plus the range R2 minus the range $R_{direct}$ (e.g., R1+R2-$R_{direct}$). A time lag $\tau$ of the local maximum from the direct signal 112 determines the bistatic range via (R1+R2-$R_{direct}$)=c×$\tau$.

A frequency of the local maximum determines a bistatic velocity which is a rate at which the bistatic range is changing. Each local maximum corresponds to a pair of position and velocity values (bistatic range and bistatic velocity) of the traffic aircraft 110 with respect to a known transmitter and receiver positions and velocities.

The position and velocity of the traffic aircraft 110 are vector quantities, each requiring a specification of 3 values (e.g., x, y, and z specify a position in a Cartesian coordinate system). This process can be applied using 3 or more broadcast signals such as the broadcast radio signal 114 at separated frequencies and broadcast antennas 108 locations to establish 6 equations (3 for bistatic range and 3 for bistatic velocity) with 6 unknowns (position and velocity vectors of the traffic aircraft 110 in three dimensions). Solution of these 6 equations provides the position and velocity vectors of the traffic aircraft 110. Alternatively, position and velocity vectors of the traffic aircraft 110 can be estimated using observations over time of two transmitters such as the broadcast transmitter 106.

These processes can in turn be repeated over time (time intervals Ti, for i=1, 2, 3) to form tracks of the traffic aircraft 110. Once the traffic aircraft 110 is sensed and tracked, the sensing aircraft such as the airborne vehicle 118 can calculate and perform evasive maneuvers to avoid collisions with the traffic aircraft 110 and can display the location of the traffic aircraft 110 to the pilot/operator of the airborne vehicle 118 (or a vehicle 118). The vehicle 118 can perform the appropriate evasive maneuvers by generating a commanded avoidance maneuver which can be optimally executed by an operator command, an autonomous automatic command, or a combination thereof.

Figure 2:
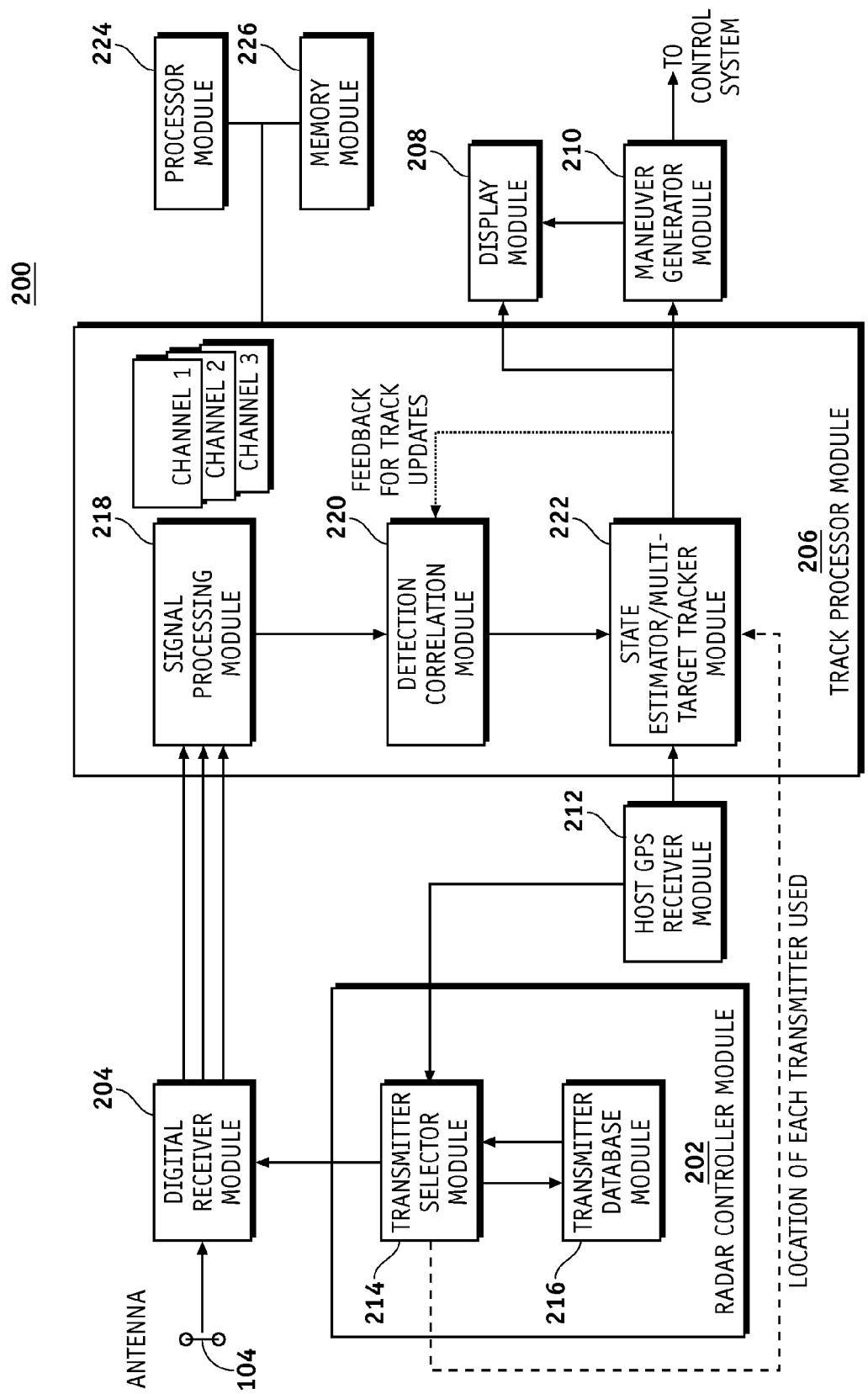
FIG. 2 is an illustration of a schematic functional block diagram of a passive bistatic radar collision avoidance system according to an embodiment of the disclosure.

FIG. 2 is an illustration of a schematic functional block diagram of a passive bistatic radar collision avoidance system 200 (system 200) according to an embodiment of the disclosure. A practical embodiment of the system 200 may comprise additional components and elements configured to support known or conventional operating features that need not be described in detail herein. In the exemplary embodiment, the system 200 can be used to derive location information in a radio frequency environment, display the location information, and calculate and invoke avoidance maneuvers.

The system 200 generally comprises, an on-board-antenna 104 (antenna(s) 104), a radar controller module 202, a digital receiver module 204, a track processor module 206, a display module 208, a maneuver generator module 210, a host aircraft GPS receiver module 212, a processor module 224, and a memory module 226.

In practice, the system 200 receives the total signal 124 received by the antenna 104 of the digital receiver module 204 comprising a sum of the broadcast radio signal received directly (direct signal 112) from the transmitter 106 and a reflected radio signal 116 (scattered signals 116), which originates at the same broadcast transmitter 106 and has reflected off of the traffic aircraft 110. The system 200 receives broadcast signals from existing broadcast transmitters such as the broadcast transmitter(s) 106 as explained above. Through use of multiple transmitters, the system 200 estimates a location and velocity of the traffic aircraft 110 based on the scattered signals 116 and the direct signal 112 received, a location of each of the broadcast transmitters 106, and the location of the airborne vehicle 118.

The radar controller module 202 may comprise a transmitter selector module 214 and a transmitter database module 216.

The transmitter selector module 214 is configured to receive a near-continuous update of a position of the host platform 118 (vehicle 118) via the host aircraft GPS receiver module 212. The transmitter selector module 214, selects at least one transmitter and location of the transmitter from the transmitter database module 216 based on a vehicle location of the vehicle 118. For example, using a current location and velocity vector of the vehicle 118, a query is performed to select, for example but without limitation, the best three or more transmitter stations comprising the broadcast transmitter 106 for the bistatic radar. The query is sent to the transmitter database module 216 from the transmitter selector module 214. In response, data comprising, for example but without limitation, the best three (or more) transmitter frequency bands for use, as well as any other receiver control information, is sent from the transmitter database module 216 to the transmitter selector module 214.

The transmitter database module 216 may be updated by users periodically, and comprises field, such as but with limitation, one or more transmitter locations, equivalent radiated power (ERP), frequency bands, receiver control parameters to be used for each broadcast transmitter 106, and terrain limitations that may inhibit a direct line of sight.

The digital receiver module 204 is configured to receive signals from the transmitters selected from the transmitter database module 216 of the radar controller module 202. The digital receiver module 204 receives the total signal 124 at the vehicle 118. The total signal 124 comprises the reflection signal 116 and the direct signal 112 (a direct signal of a broadcast radio signal). The reflection signal 116 comprises the broadcast radio signal 114 from the broadcast transmitter(s) 106 reflected off the traffic aircraft 110. The digital receiver module 204 performs operations to produce an output stream of data (e.g., captured in in-phase-quadrature (I-Q modulation format), or other modulation format) that allows the ambiguity function $\psi(\tau, f_D)$ represented by the equation (1) above to be calculated.

The digital receiver module 204 provides sufficient linearity and operates on sufficient bandwidth and/or for sufficient integration time to allow dynamic range sufficient for detection of the traffic aircraft 110 at ranges suitable for collision avoidance (e.g., about 2 km is substantially a minimum). The digital receiver module 204 produces a data stream that comprises signals from each of the three or more transmitters such as the broadcast transmitter 106 as indicated by the transmitter database module 216 of the radar controller module 202.

The track processor module 206 may comprise a signal processing module 218, a detection and correlation module 220, and a state estimator/multi-target tracker module 222.

The signal processing module 218 is configured to estimate a location of the traffic aircraft 110 based on the reflection signal 116, a location of the broadcast transmitter 106, and a location of the host platform 118. The signal processing module 218 perform calculations associated with the self-ambiguity function $\psi(\tau, f_D)$ of the equation (1) above, and produces a series of candidate detections expressed in bistatic range/bistatic Doppler coordinates, at specific time intervals (e.g., about 1 Hz). These operations may be conducted using data from each of, for example but without limitation, three (or more) transmitters as determined by the radar controller module 202. Signals from the transmitters may be processed as, for example but without limitation, separate channels such as channels 1-3.

The detection and correlation module 220 is configured to operate on candidate detections from the signal processing module 218, determining whether or not the detections correlate in time. If they do, a "track" is created in bistatic range/bistatic Doppler space for each of the transmitters such as the broadcast transmitter 106. These tracks are maintained and passed to the state estimator/multi target tracker module 222.

The state estimator/multi-target tracker module 222 receives the track updates (e.g., in bistatic range/bistatic Doppler space) from the detection and correlation module 220, as well as the position and velocity of the host platform 118 from the host aircraft GPS receiver module 212. Each "track" in bistatic range/Doppler space defines an ellipsoid in absolute space. A current position of the vehicle 118 and the broadcast transmitter 106 should be known or estimated to complete this translation to absolute space.

The ellipsoid comprises all the possible positions in absolute space that could produce the bistatic range position. By combining data from, for example, three stationery transmitter stations, a position may be completely resolved, and a velocity may be resolved after a moderate observation time. Refinement/elimination of absolute space positions is possible with detections generated from two broadcast transmitters 106 by observing bistatic positions and velocities over time, and with one of the transmitters 106 by observing bistatic positions and velocities over time and using prescribed maneuvers by the vehicle 118. With all estimated positions and velocities, the corresponding uncertainties are produced.

The display module 208 is configured to display various information and images. For example but without limitation, the display module 208 displays position of the traffic aircraft 110, a warning signal to capture an attention of a pilot (user/ UAS operator), recommended avoidance flight paths, a position of the traffic aircrafts 110, a warning signal, a commanded avoidance maneuver, an estimated location of the traffic aircraft 110, or other information. Once a track is established in absolute space, and if the current position and velocity vector (with derived orientation) of the vehicle 118 are known, the traffic aircraft 110 position may be displayed to the pilot (user/UAS operator). The display module 208 can be presented in both azimuth—elevation (also known as a "vertical" or "out the window" display) and in azimuth— range (also known as a "horizontal display", "moving map display", or "god's eye view").

The display module 208 may be constructed by using a display device, for example, a liquid crystal display (LCD) panel, an organic electro-luminescence (EL) panel or any other display device suitable for operation of the system 200.

The maneuver generator module 210 (collision avoidance system 210) is configured to generate an appropriate "escape" maneuver and, when selected, drives a control system/flight control system of the host platform 118. The escape maneuver may substantially maximize a separation between the host platform 118 and the traffic aircraft 110 while maintaining optimal flight operation (e.g., via constraints on minimum/maximum airspeed, maximum accelerations, and operating altitude). The system 200 may comprise an interface (not shown) between the collision avoidance system 210 and suitably equipped host platform 118 that enables an execution of a commanded avoidance maneuver.

The host aircraft GPS receiver module 212 provides the position and velocity of the vehicle 118 to the radar controller module 202 and the track processor module 206. A surrogate for orientation of the host platform 118 in an absolute space is derivable from a GPS feed.

The processor module 224 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor module 224 comprise processing logic that is configured to carry out the functions, techniques, and processing tasks associated with the operation of the system 200.

In particular, the processing logic is configured to support the collision avoidance method described herein. Furthermore, the steps of a method or algorithm described in connection with the embodiments disclosed herein may be embodied directly in hardware, in firmware, in a software module executed by processor module 224, or in any practical combination thereof.

The memory module 226, may be realized as a non-volatile storage device (non-volatile semiconductor memory, hard disk device, optical disk device, and the like), a random access storage device (for example, SRAM, DRAM), or any other form of storage medium known in the art. The memory module 226 may be coupled to the processor module 224 such that the processor module 224 can read information from, and write information to, the memory module 226.

As an example, the processor module 224 and memory module 226, may reside in their respective ASICs. The memory module 226 may also be integrated into the processor module 224. In an embodiment, the memory module 226 may include a cache memory for storing temporary variables or other intermediate information during execution of instructions to be executed by processor module 224. The memory module 226 may also include non-volatile memory for storing instructions to be executed by processor module 224.

The memory module 226 may comprise the transmitter database module 216 for storing data. The data may comprise, for example but without limitation, one or more transmitter locations, equivalent radiated power (ERP), frequency bands, receiver control parameters to be used for each broadcast transmitter 106, terrain limitations that may inhibit a direct line of sight, or other data suitable for operation of the system 200 in accordance with embodiments of the disclosure.

The transmitter database module 216 may be configured to store, maintain, and provide data as needed to support the functionality of system 200 in the manner described above. Moreover, the transmitter database module 216 may be a local database coupled to each of the processor module 224, or may be a remote database, for example, a central network database, or other database. The memory module 226 may also store, a computer program that is executed by the processor module 224 respectively, an operating system, an application program, tentative data used in executing a program processing, and the like.

Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

System 200 may be enhanced to enable a detection of targets with lower bistatic cross sections and/or detections at greater range and/or to increase an accuracy of an estimated location of the traffic aircraft 110. Two exemplary embodiments are discussed below to improve performance of the system 200 by: 1) the use of an antenna array (multiple antennas) for direct signal suppression to increase a range at which the traffic aircraft 110 can be detected, and 2) the use of multi-staged operations which uses multiple classes of transmitters to increase an accuracy of an estimated location of the traffic aircraft 110.

Figure 3:
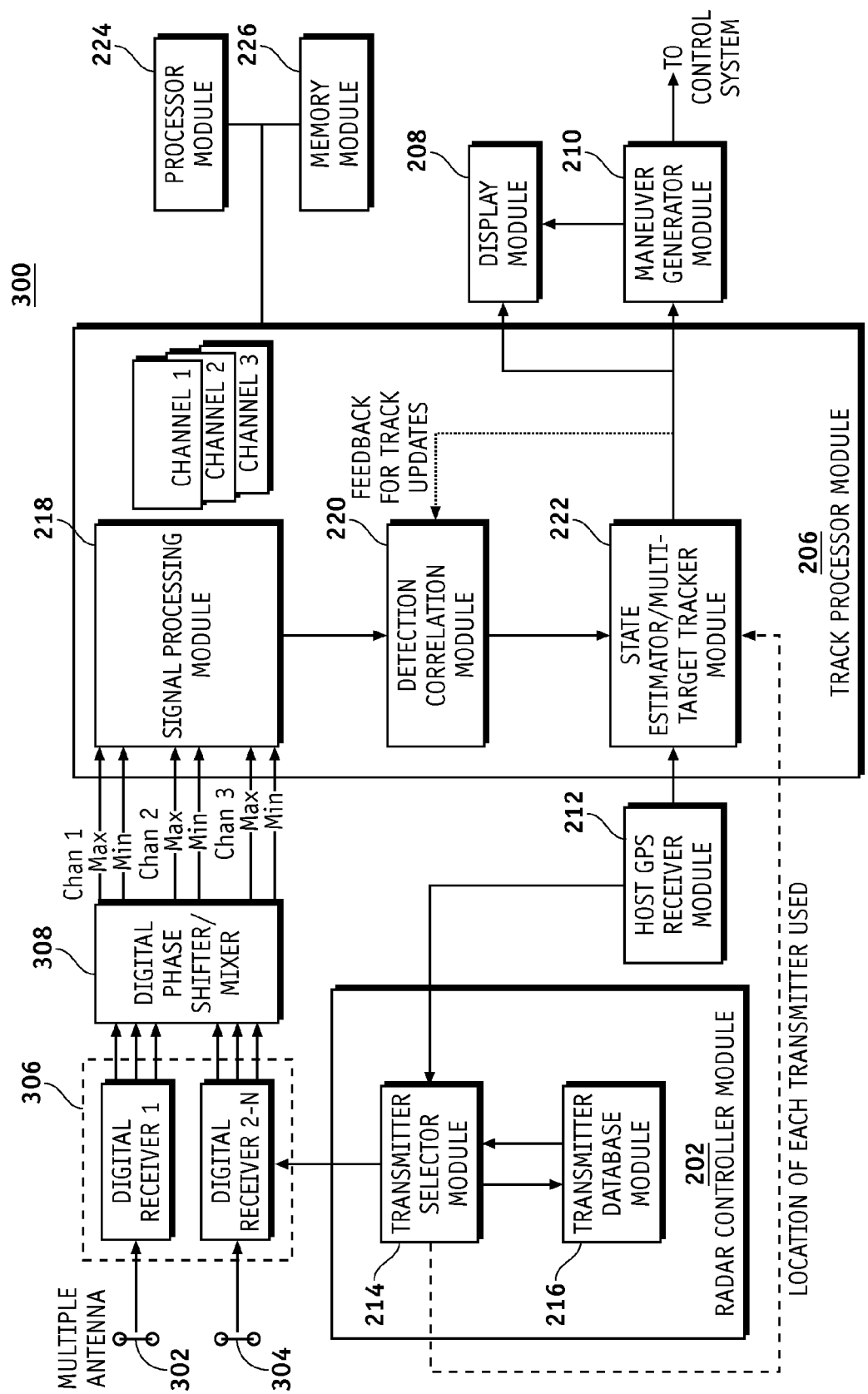
FIG. 3 is an illustration of a schematic functional block diagram of a multiple antenna passive bistatic radar collision avoidance system according to an embodiment of the disclosure.

FIG. 3 is an illustration of a schematic functional block diagram of a multiple antennas passive bistatic radar collision avoidance system 300 (system 300) according to an embodiment of the disclosure. The system 300 may have functions, material, and structures that are similar to the embodiments shown in FIGS. 1-2. Therefore common features, functions, and elements may not be redundantly described here. The system 300 differs from the system 200 in that each of a plurality of antennas 302-304 uses a receiver set module 306 and a phase shifter/mixer module 308 is added.

In practice, a use of multiple antennas enables suppression of the direct signal 112 which is the broadcast signals received directly from the broadcast transmitters 106, which in turn enables a detection of the traffic aircraft 110 at greater ranges. For example, multiple broadcast transmitters such as the broadcast transmitters 106 may be used for detecting the location of the traffic aircraft 110. The system 300 receives the total signal 124 at the multiple antennas antenna 1 (302) to antenna 2-N (304) (i.e., antenna 2-N (304) representing an antenna 2 through an antenna N) of the receiver set module 306, where N is an integer representing a total number of antennas. The total signal 124 comprises a sum of the direct signal 112 from the transmitter 106 and the scattered signal 116, which originates at the same broadcast transmitter 106 and has reflected off of the traffic aircraft 110.

Signals from each of the antenna 1 (302) to antenna 2-N (304) are phase shifted and summed so as to produce a first phase shifted signal comprising a direct signal 112 minimized (minimized surrogate signal). The signals from each of the antenna 1 (302) to antenna 2-N (304) are then phase shifted and summed so as to produce a second phase shifted signal comprising the direct signal 112 maximized (maximized surrogate signal).

A pair of summed signals comprising the minimized surrogate signal, and the maximized surrogate signal is produced for each broadcast transmitter 106 used. Alternatively, a pair of summed signals comprising the minimized surrogate signal, and the minimized surrogate signal is produced for each broadcast transmitter 106. As a further alternative, a pair of summed signals comprising the maximized surrogate signal, and the maximized surrogate signal is produced for each broadcast transmitter 106 used. The system 300 estimates the location and velocity of the second airborne vehicle based on the pair of summed signals, the location of the transmitters, and the location of the traffic aircraft 110.

For each transmitter 106 at least two output streams of data are produced. GPS information and location of the broadcast transmitters 106 can be used to determine a line of sight to the broadcast transmitters 106, enabling an "open loop" phase shift calculation for maximization/minimization (e.g., via maximization/minimization functions). Alternatively, the phase shift may be performed adaptively, using feedback from a first range bin of the ambiguity function calculation (equation (1)). The minimum and maximum signals are used in the ambiguity function of the equation (1) in the signal processing module 218. Specifically, the minimum signal is multiplied by a complex conjugate of the time lagged maximum signal.

A performance according to this embodiment is driven by practical limits on a dynamic range that is achievable by a processing system. To first order, a ratio of a smallest detectable signal to a largest (the largest is the direct path) is equal to a useable bandwidth (e.g., about 6 MHz for broadcast DTV) times an integration time—the time used in the signal processing module 218 (e.g., about 2 seconds). For Digital TV (DTV), this provides about 70 dB of dynamic range. 70 dB of dynamic range allows a detection of an about 0 dBsm target at roughly 2 km.

The receiver set module 306 is configured to receive a first total signal 124 comprising a reflected signal 116 and the direct signal 112 at a first antenna such as the antenna 302, and receive a second total signal (not shown) comprising a second reflected signal and a second direct signal at a second antenna such as the antenna 304.

The signal processing module 218 is configured to calculate a phase shift between the antenna 302 and the antenna 304 based on a location of the broadcast transmitter 106 and a location of the vehicle 118 such that the direct signal 112 of the broadcast radio signal 114 is substantially cancelled to the substantially maximum extent possible. Alternatively, a required phase shift can be calculated adaptively using data from the signal processing module 218.

Suppression of the direct signal 112 enables the detection of traffic 110 with lower radar cross sections or at greater range. Suppression can be achieved through the use of real or (depending on the nature of the transmitted signal) synthetic antennas. Using multiple antennas 302-304 in concert with a phase shifter/mixer module 308, the direct signal 112 can be substantially nulled.

Figure 4:
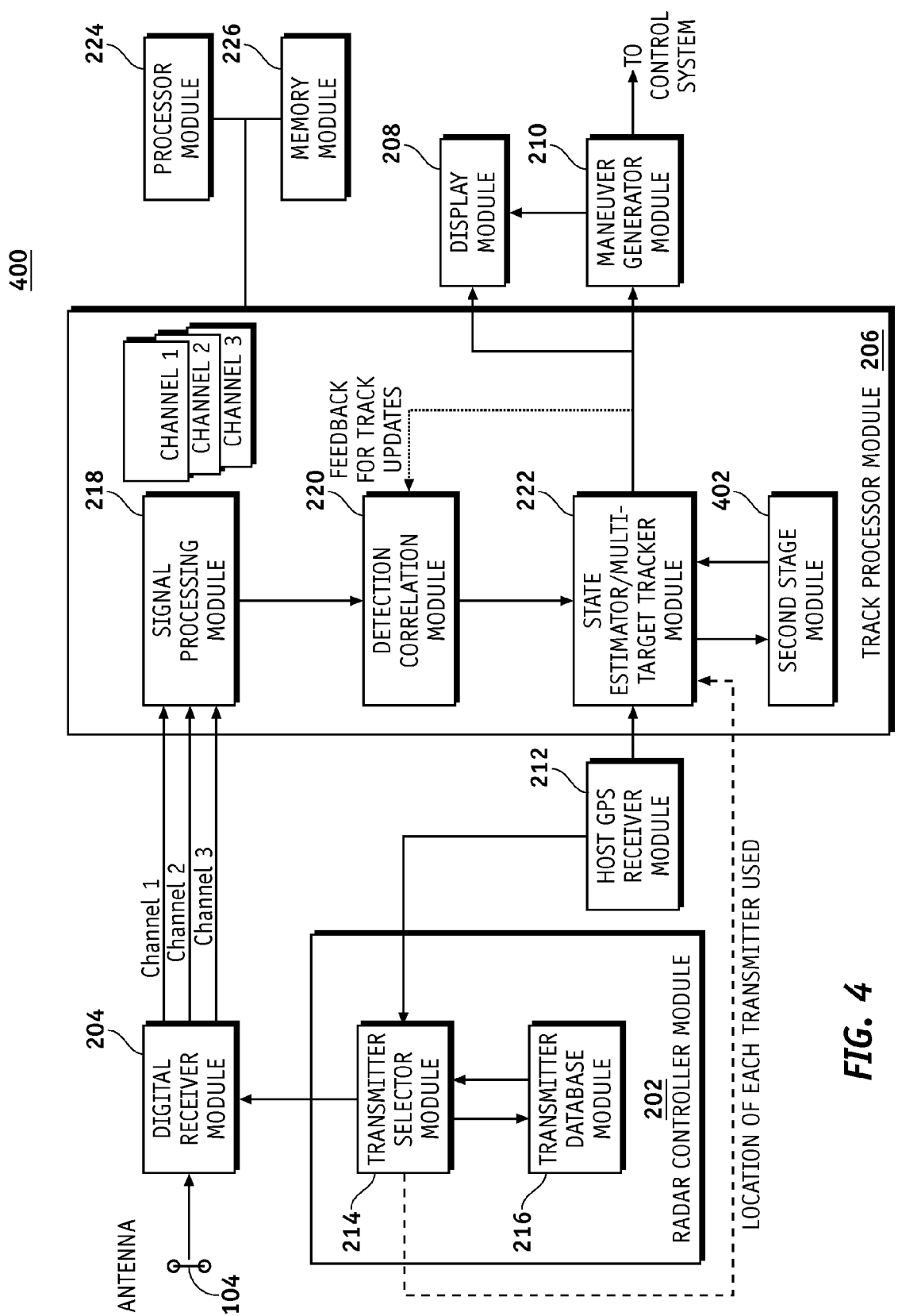
FIG. 4 is an illustration of a schematic functional block diagram of a multi stage passive bistatic radar collision avoidance system according to an embodiment of the disclosure.

FIG. 4 is an illustration of a schematic functional block diagram of a multi-stage passive bistatic radar collision avoidance system 400 (system 400) according to an embodiment of the disclosure. This class of operation is dictated because source signals that provide some of the best positional information (such as reflected GPS signals) are more difficult to detect than signals that provide coarse location (such as FM radio stations). Detection of the GPS-like reflected signals is aided if the coarse position is known.

The system 400 may have functions, material, and structures that are similar to the embodiments shown in FIGS. 1-3. Therefore common features, functions, and elements may not be redundantly described here. The system 400 is different from the system 200 in that a second radar/detection stage module 402 (the second stage module 402) is added in the system 400. The system 400 may comprise at least two radar/detection stages modules such as the second radar/detection stage module 402 using different classes of stationary or space-based broadcast transmitters.

The second stage module 402 may comprise a duplicative set (not shown) of the on-board-antenna 104, a transmitter selector module 214 for a second band (e.g., GPS), a digital receiver module 204 for the second band, and a track processor module 206 tailored to the second band. An approximate location of the traffic aircraft 110 is obtained as explained above. The approximate location of the traffic aircraft 110 is then used to initiate another instantiation of a method or methods described above in connection to systems 200 and 300. A refined location of the traffic aircraft 110 is then obtained by using a different broadcast band. System 400 enables an exploitation of a substantially precise location capability of some broadcast bands (e.g., the GPS band) while accommodating inherent challenges in detection associated with those bands.

The second stage module 402 is initiated and tuned to a coarse location provided by a first stage (comprising the system 200 or system 300 without the second stage module 402).

In one embodiment, the system 400 which improves positional accuracies of tracks on the traffic aircraft 110 can be combined with the system 300 which improves the range or detectable traffic aircraft 110/radar cross section (RCS).

Figure 5:
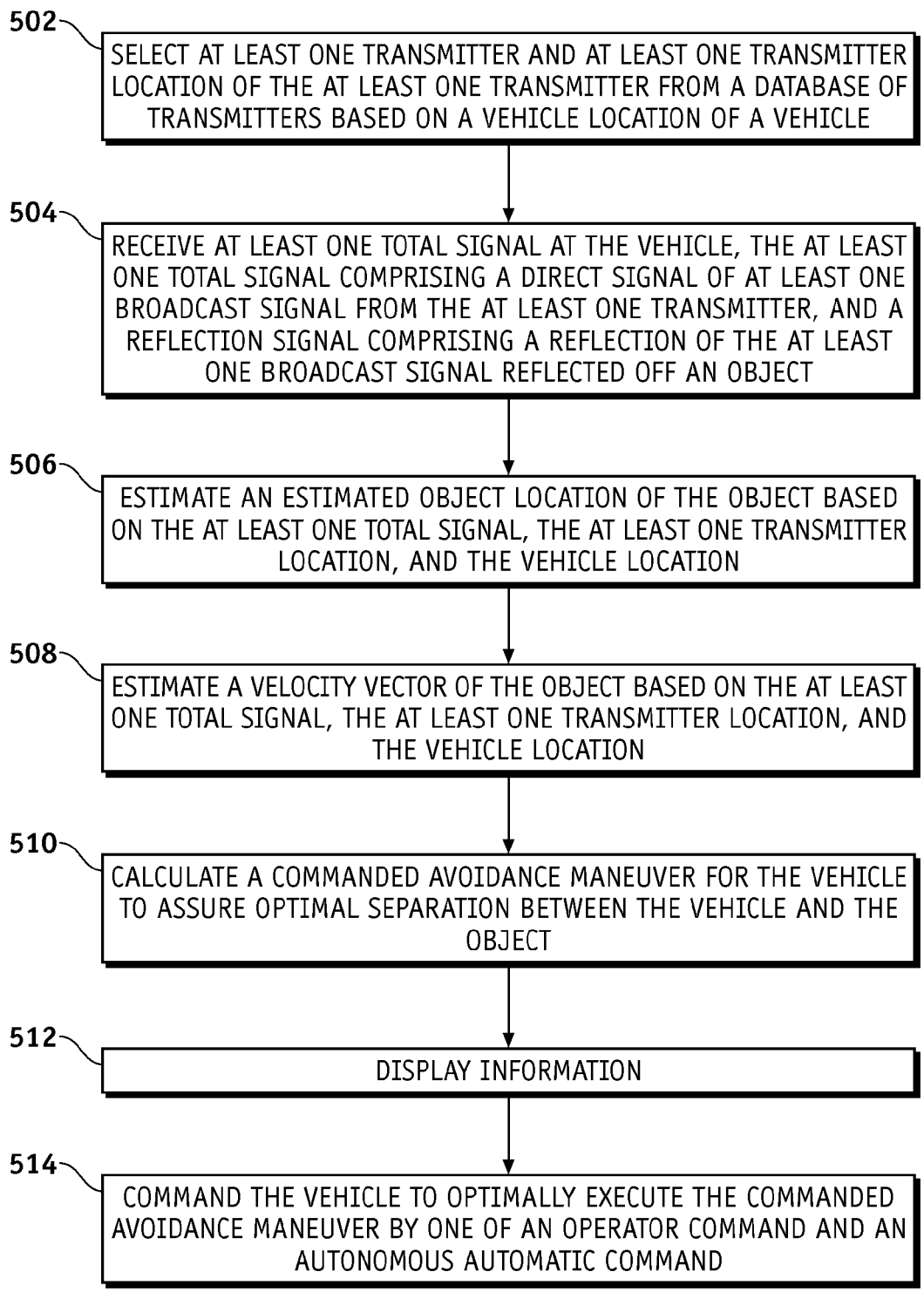
FIG. 5 is an illustration of an exemplary flowchart showing a process for avoiding collision by using a passive bistatic radar collision avoidance system according to an embodiment of the disclosure.

FIG. 5 is an illustration of an exemplary flowchart showing a process 500 for avoiding collision according to an embodiment of the disclosure. The various tasks performed in connection with the process 500 may be performed by software, hardware, firmware, a computer-readable medium having computer executable instructions for performing the process method, or any combination thereof. The process 500 may be recorded in a computer-readable medium such as a semiconductor memory, a magnetic disk, an optical disk, and the like, and can be accessed and executed, for example, by a computer CPU such as the processor module 224 in which the computer-readable medium is stored.

It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. In practical embodiments, portions of the process 500 may be performed by different elements of the environment 100 and the systems 200-400 such as: the on-board receiver 102, the on-board antennas 104, the vehicle 118, the broadcast transmitter 106, the broadcast antennas 108, the traffic aircraft 110, the antennas 302 to 304, the receiver set module 306, the second stage module 402, the phase shifter/mixer module 308, etc. Process 300 may have functions, material, and structures that are similar to the embodiments shown in FIGS. 1-4. Therefore common features, functions, and elements may not be redundantly described here.

Process 500 may begin by selecting at least one transmitter such as the transmitter 106 and at least one transmitter location of the at least one transmitter 106 from a database of transmitters such as the transmitter database module 216 based on a vehicle location of a vehicle such as the vehicle 118 (task 502).

Process 500 may continue by receiving at least one total signal such as the total signal 124 at the vehicle 118, the at least one total signal 124 comprising: a direct signal such as the direct signal 112 of at least one broadcast signal such as the broadcast signal 114 from the at least one transmitter 106, and a reflection signal such as the reflection signal 116 comprising a reflection of the at least one broadcast signal 114 reflected off an object such as the object 110 (task 504).

Process 500 may continue by estimating an estimated object location of the object 110 based on the at least one total signal 124, the at least one transmitter location, and the vehicle location (task 506).

Process 500 may continue by estimating a velocity vector of the object 110 based on the at least one total signal 124, the at least one transmitter location, and the vehicle location (task 508).

Process 500 may further continue by calculating a commanded avoidance maneuver for the vehicle 118 to assure optimal separation between the vehicle 118 and the object 110 (task 510).

Process 500 may further continue by displaying information (task 512). The information may be displayed to an operator/user of the vehicle 118. The information may comprise, for example but without limitation, a position of the object 110, a warning signal, a commanded avoidance maneuver, an estimated location of the object 110, or other information.

Process 500 may continue by commanding the vehicle 118 to optimally execute the commanded avoidance maneuver by one of an operator/user command and an autonomous automatic command (task 514). An automated execution of the commanded avoidance maneuver can be performed by the vehicle 118 comprising suitable equipment for automatically executing such maneuvers. The commanded avoidance maneuver may be performed by the autonomous automatic command, directed by an operator/user, or a combination thereof.

Figure 6:
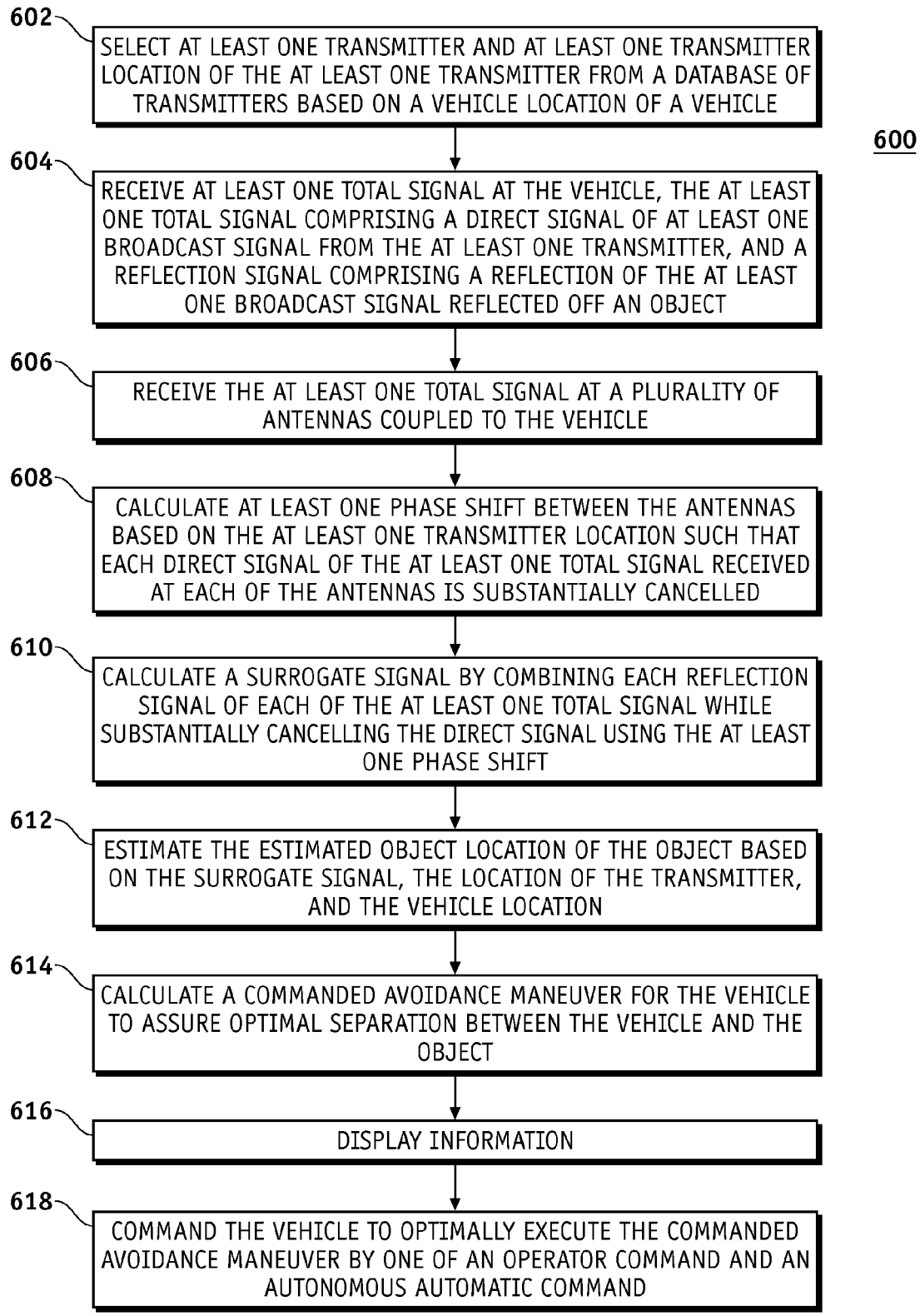
FIG. 6 is an illustration of an exemplary flowchart showing a process for employing multiple antennas on a vehicle as a means for increasing an operable range of a bistatic radar collision avoidance system according to an embodiment of the disclosure.

FIG. 6 is an illustration of an exemplary flowchart showing a process 600 for employing multiple antennas 302-304 on the vehicle 118 as a means for increasing an operable range of a bistatic radar collision avoidance system according to an embodiment of the disclosure. The multiple antennas 302-304 on the vehicle 118 are configured to increase the detection range capability of the collision avoidance system.

The various tasks performed in connection with the process 600 may be performed by software, hardware, firmware, a computer-readable medium having computer executable instructions for performing the process method, or any combination thereof. The process 600 may be recorded in a computer-readable medium such as a semiconductor memory, a magnetic disk, an optical disk, and the like, and can be accessed and executed, for example, by a computer CPU such as the processor module 224 in which the computer-readable medium is stored.

It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. In practical embodiments, portions of the process 600 may be performed by different elements of the systems 200-400 such as the on-board receiver 102, the on-board antennas 104, the vehicle 118, the broadcast transmitter 106, the broadcast antennas 108, the traffic aircraft 110 (object 110), the antennas 302 to 304, the receiver set module 306, the second stage module 402, the phase shifter/mixer module 308, etc. Process 600 may have functions, material, and structures that are similar to the embodiments shown in FIGS. 1-4. Therefore common features, functions, and elements may not be redundantly described here.

Process 600 may begin by selecting at least one transmitter such as the transmitter 106 and at least one transmitter location of the at least one transmitter 106 from a database of transmitters such as the transmitter database module 216 based on a vehicle location of a vehicle such as the vehicle 118 (task 602).

Process 600 may continue by receiving at least one total signal such as the total signal 124 at the vehicle 118, the at least one total signal 124 comprising: a direct signal such as the direct signal 112 of at least one broadcast signal such as the broadcast signal 114 from the at least one transmitter 106, and a reflection signal such as the reflection signal 116 comprising a reflection of the at least one broadcast signal 114 reflected off an object such as the object 110 (task 604).

Process 600 may continue by receiving the at least one total signal 124 at a plurality of antennas such as the antennas 302-304 coupled to the vehicle 118 (task 606).

Process 600 may continue by calculating at least one phase shift between the antennas 302-304 based on the at least one transmitter location such that each direct signal such as the direct signal 112 of the at least one total signal 124 received at each of the antennas 302-304 is substantially cancelled (task 608).

The process 600 may continue by calculating a surrogate signal by combining each reflection signal 116 of each of the at least one total signal 124 while substantially cancelling the direct signal 112 using the phase shift (task 610).

The process 600 may then continue by estimating the estimated object location of the object 110 based on the surrogate signal, the location of the transmitter, and the vehicle location (task 612).

The process 600 may then continue by calculating a commanded avoidance maneuver for the vehicle 118 to assure optimal separation between the vehicle 118 and the object 110 (task 614).

The process 600 may then continue by displaying information (task 616).

The process 600 may then continue by commanding the vehicle 118 to optimally execute the commanded avoidance maneuver by one of an operator/user command and an autonomous automatic command (task 618).

Figure 7:
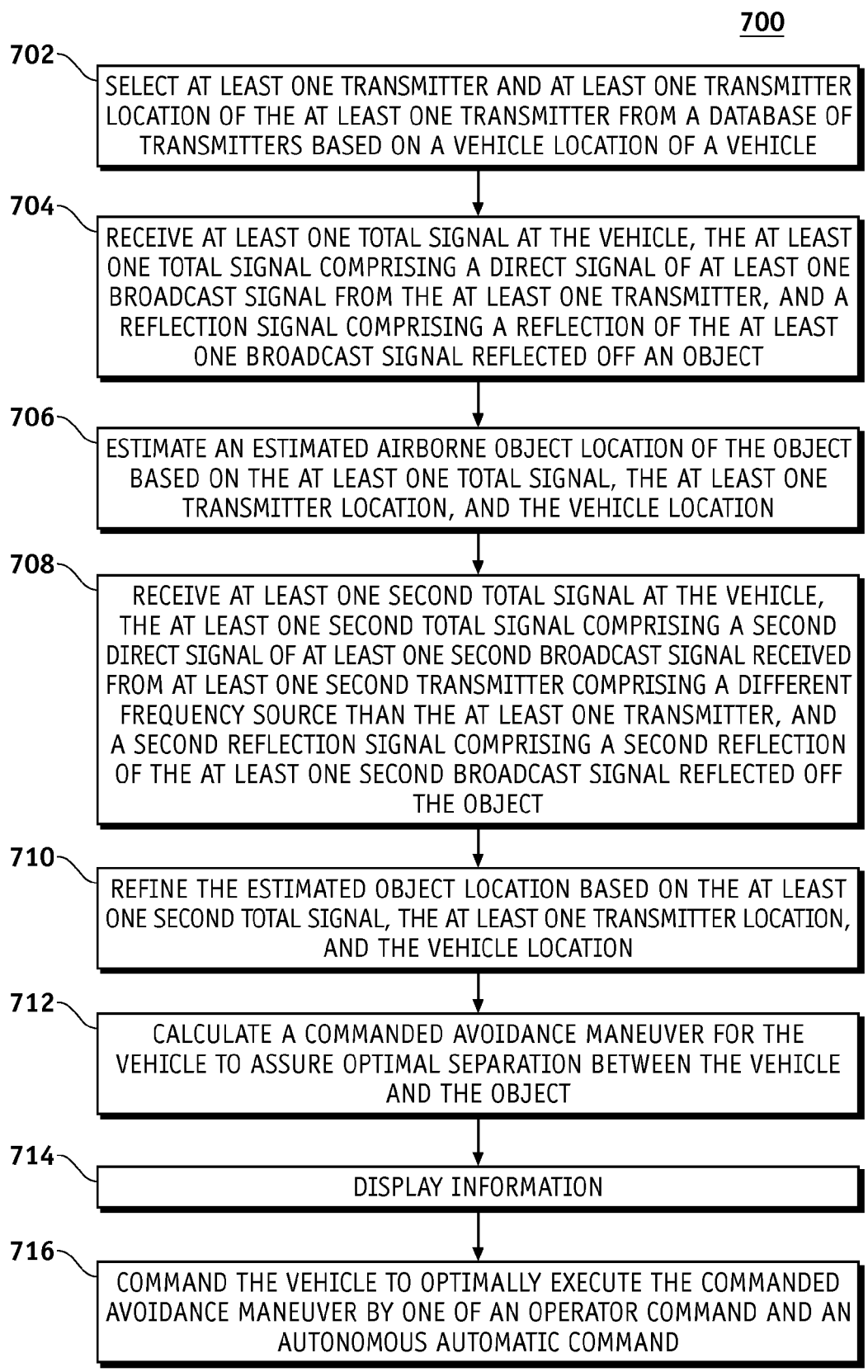
FIG. 7 is an illustration of an exemplary flowchart showing a process for employing multiple detection/radar stages as a means for increasing an operable accuracy of a bistatic radar collision avoidance system according to an embodiment of the disclosure.

FIG. 7 is an illustration of an exemplary flowchart showing a process for employing multiple detection/radar stages as a means for increasing an operable accuracy of a bistatic radar collision avoidance system according to an embodiment of the disclosure. Multiple detection stages (e.g., multiple radar stages) on the vehicle 118 increase positional accuracy of the collision avoidance system 400 for estimating the location of traffic aircraft 110 (object 110).

The various tasks performed in connection with the process 700 may be performed by software, hardware, firmware, a computer-readable medium having computer executable instructions for performing the process method, or any combination thereof. The process 700 may be recorded in a computer-readable medium such as a semiconductor memory, a magnetic disk, an optical disk, and the like, and can be accessed and executed, for example, by a computer CPU such as the processor module 224 in which the computer-readable medium is stored.

It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. In practical embodiments, portions of the process 700 may be performed by different elements of the systems 200-400 such as the on-board receiver 102, the on-board antennas 104, the vehicle 118, the broadcast transmitter 106, the broadcast antennas 108, the traffic aircraft 110 (object 110), the antennas 302 to 304, the receiver set module 306, the second stage module 402, the phase shifter/mixer module 308, etc. Process 700 may have functions, material, and structures that are similar to the embodiments shown in FIGS. 1-4. Therefore common features, functions, and elements may not be redundantly described here.

Process 700 may begin by selecting at least one transmitter such as the transmitter 106 and at least one transmitter location of the at least one transmitter 106 from a database of transmitters such as the transmitter database module 216 based on a vehicle location of a vehicle such as the vehicle 118 (task 702).

Process 700 may continue by receiving at least one total signal such as the total signal 124 at the vehicle 118, the at least one total signal 124 comprising: a direct signal such as the direct signal 112 of at least one broadcast signal such as the broadcast signal 114 from the at least one transmitter 106, and a reflection signal such as the reflection signal 116 comprising a reflection of the broadcast signal 114 reflected off an object such as the object 110 (task 704).

Process 700 may continue by estimating an estimated object location of the object 110 based on the at least one total signal 124, the at least one transmitter location, and the vehicle location (task 706).

Process 700 may continue by receiving at least one second total signal at the vehicle 118, the at least one second total signal comprising a second direct signal of at least one second broadcast signal from at least one second transmitter comprising a different frequency source (radio frequency source) than the at least one transmitter, and a second reflection signal comprising a second reflection of the at least one second broadcast signal reflected off the object 110 (708).

Process 700 may continue by refining the estimated object location based on the at least one second total signal, the at least one transmitter location, and the vehicle location (task 710).

Process 700 may further continue by calculating a commanded avoidance maneuver for the vehicle 118 to assure optimal separation between the vehicle 118 and the object 110 (task 712).

Process 700 may further continue by displaying information (task 714). The information may be displayed to an operator of the vehicle. The information may comprise, for example but without limitation, a position of the object 110, a warning signal, a commanded avoidance maneuver, an estimated location of the object 110, or other information.

Process 700 may then continue by commanding the vehicle to optimally execute the commanded avoidance maneuver by one of an operator command and an autonomous automatic command (task 716).

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

The term real-time refers to a signal that is continuously being sent and received, with little or no time delay. The term near-real-time refers to a real-time signal with substantially no significant time delay. The time delay may be a delay introduced by, for example but without limitation, automated data processing or network transmission, between occurrence of an event, and the like. In this document, the term real-time refers to both real-time and near-real-time.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 224 to cause the processor module 224 to perform specified operations. Such instructions, generally referred to as "computer program code" or "program code" (which may be grouped in the form of computer programs or other groupings), when executed, enable a method of using a system.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for onboard sense and avoidance of an object, the method comprising:
    selecting by action of a processor at least one transmitter and at least one transmitter location of the at least one transmitter from a database of transmitters based on a vehicle location of a vehicle;
    receiving by action of the processor at least one total signal at the vehicle, the at least one total signal comprising:
        a direct signal of at least one broadcast signal from the at least one transmitter, and
        a reflection signal comprising a reflection of the at least one broadcast signal reflected off an object; and
    estimating by action of the processor an estimated object location of the object based on the at least one total signal, the at least one transmitter location, and the vehicle location.

2. The method of claim 1, further comprising estimating by action of the processor a velocity vector of the object based on the at least one total signal, the at least one transmitter location, and the vehicle location.

3. The method of claim 1, further comprising:
    calculating by action of the processor a commanded avoidance maneuver for the vehicle to assure an optimal separation between the vehicle and the object; and
    commanding by action of the processor the vehicle to optimally execute the commanded avoidance maneuver by one of an operator command and an autonomous automatic command.

4. The method of claim 1, further comprising displaying action of the processor information comprising at least one member selected from the group consisting of: a warning signal, a commanded avoidance maneuver, and the estimated object location.

5. The method of claim 1, further comprising:
    receiving by action of the processor the at least one total signal at a plurality of antennas coupled to the vehicle respectively; and
    calculating by action of the processor at least one phase shift between the antennas based on the at least one transmitter location such that each direct signal of the at least one total signal received at each of the antennas is substantially cancelled.

6. The method of claim 1, wherein the at least one broadcast signal comprises at least one member selected from the group consisting of: an Ultra High Frequency signal, a Very High Frequency signal, a Frequency Modulation signal, an Amplitude Modulation signal, a space-based transmitter signal, and a short wave signal.

7. The method of claim 1, further comprising:
    receiving by action of the processor at least one second total signal at the vehicle, the at least one second total signal comprising:
        a second direct signal of at least one second broadcast signal from at least one second transmitter comprising a different frequency source than the at least one transmitter, and
        a second reflection signal comprising a second reflection of the at least one second broadcast signal reflected off the object; and
    refining by action of the processor the estimated object location based on the at least one second total signal, the at least one transmitter location, and the vehicle location.

8. The method of claim 7, further comprising acquiring by action of the processor the at least one second total signal using the estimated object location.

9. A passive bistatic radar onboard sense and avoidance system comprising:
    a transmitter selector module operable to select at least one transmitter and at least one transmitter location of the at least one transmitter from a database of transmitters based on a vehicle location of a vehicle;
    a receiver module operable to receive at least one total signal at the vehicle, the at least one total signal comprising a direct signal of at least one broadcast signal from the at least one transmitter, and a reflection signal comprising a reflection of the at least one broadcast signal reflected off an object; and
    a processing module operable to estimate an estimated object location of the object based on the at least one total signal, the at least one transmitter location, and the vehicle location.

10. The passive bistatic radar onboard sense and avoidance system of claim 9, wherein the processing module is further operable to estimate a velocity vector of the object based on the at least one total signal, the at least one transmitter location, and the vehicle location.

11. The passive bistatic radar onboard sense and avoidance system of claim 9, wherein:
    the receiver module is further operable to receive the at least one total signal at a plurality of antennas coupled to the vehicle; and
    the processing module is further operable to:
        calculate at least one phase shift between the antennas based on the at least one transmitter location such that each direct signal of the at least one total signal received at each of the antennas is substantially cancelled;
        calculate a surrogate signal by combining each reflection signal of each of the at least one total signal while substantially cancelling the direct signal using the at least one phase shift; and
        estimate the estimated object location of the object based on the surrogate signal, the location of the transmitter, and the vehicle location.

12. The passive bistatic radar onboard sense and avoidance system of claim 11, further comprising multiple antennas operable to substantially cancel the direct signal to improve a range for detecting the object.

13. The passive bistatic radar onboard sense and avoidance system of claim 9, further comprising a display module operable to display various information comprising at least one member selected from the group consisting of: a warning signal, a commanded avoidance maneuver, and the estimated object location.

14. The passive bistatic radar onboard sense and avoidance system of claim 9, further comprising multiple detection stages operable to improve positional accuracies of tracks of the object.

15. The passive bistatic radar onboard sense and avoidance system of claim 9, further comprising an interface between a collision avoidance system and the vehicle that enables an execution of a commanded avoidance maneuver.

16. A method for correcting a reflected signal from an object, the method comprising:

selecting by action of a processor at least one transmitter and at least one transmitter location of the at least one transmitter from a database of transmitters based on a vehicle location of a vehicle; and calculating by action of the processor at least one phase shift between a plurality of antennas of the vehicle based on the at least one transmitter location such that at least one direct signal of at least one broadcast signal from the at least one transmitter received at each of the antennas is substantially cancelled.

17. The method of claim 16, further comprising:

receiving by action of the processor a plurality of total signals at the antennas respectively, the total signals each comprising a reflection signal reflected off an object and a direct signal from among the at least one direct signal; and calculating by action of the processor a surrogate signal by combining each reflection signal of each of the total signals while substantially cancelling the direct signal using the at least one phase shift.

18. The method of claim 17, further comprising estimating action of the processor an estimated object location of the object based on the surrogate signal, the location of the transmitter, and the vehicle location.

19. The method of claim 17, wherein substantially cancelling the direct signal improves a range for detecting the object.

20. The method of claim 17, wherein the object and the vehicle each comprise an airborne aircraft.

* * * * *